(12) United States Patent
Sawahata et al.

(10) Patent No.: US 10,914,386 B2
(45) Date of Patent: Feb. 9, 2021

(54) METHOD OF CONTROLLING A GATE VALVE

(71) Applicant: V-Tex Corporation, Tokyo (JP)

(72) Inventors: Tomohiro Sawahata, Hitachinaka (JP);
Katsuyuki Saitoh, Hitachinaka (JP);
Hideaki Nagai, Hitachinaka (JP);
Mitsuhiro Ikeda, Hitachinaka (JP)

(73) Assignee: V-Tex Corporation, Tokyo (JP)

( * ) Notice: Subject to any disclaimer, the term of this patent is extended or adjusted under 35 U.S.C. 154(b) by 0 days.

(21) Appl. No.: 16/285,856

(22) Filed: Feb. 26, 2019

(65) Prior Publication Data

US 2019/0316688 A1 Oct. 17, 2019

(30) Foreign Application Priority Data

Apr. 13, 2018 (JP) ................................. 2018-077270

(51) Int. Cl.
*F16K 3/02* (2006.01)
*G05D 19/00* (2006.01)
*F16K 11/14* (2006.01)
*F16K 13/08* (2006.01)
*F16K 51/02* (2006.01)
*F16K 31/00* (2006.01)
*F16K 3/00* (2006.01)

(52) U.S. Cl.
CPC .............. *F16K 3/0254* (2013.01); *F16K 3/00* (2013.01); *F16K 11/14* (2013.01); *F16K 13/08* (2013.01); *F16K 31/00* (2013.01); *F16K 51/02* (2013.01); *G05D 19/00* (2013.01)

(58) Field of Classification Search
CPC .......... F16K 3/00; F16K 3/0254; F16K 13/08; F16K 11/14; F16K 51/02; F16K 31/00; G05D 19/00
USPC .................................................. 251/326, 328
See application file for complete search history.

(56) References Cited

U.S. PATENT DOCUMENTS 5,201,490 A * 4/1993 Maraud et al. .......... F16K 1/443
251/120
2006/0033065 A1 2/2006 Duelli et al.
(Continued)

FOREIGN PATENT DOCUMENTS

JP 3433207 B2 8/2003
JP 2006-52846 A 2/2006

*Primary Examiner* — Kevin L Lee
(74) *Attorney, Agent, or Firm* — Crowell & Moring LLP

(57) ABSTRACT

An object of the invention is to provide a method of controlling a gate valve that operates the gate valve in a short time while suppressing vibration of the valve body. A method of controlling a gate valve provided on an opening of a chamber, wherein the gate valve includes a valve body that opens and closes so as to close the opening of a chamber, a valve seat provided on the edge of the opening to which the valve body is pressed, and a sealing material for sealing between the valve body and the valve seat. The invented method is characterized in that, in moving the valve body to the open position from the closed position where the valve body is pressed against the valve seat with the sealing material compressed, the valve body is made to stop temporarily for a predetermined time at the position immediately before the compressed sealing material is pulled apart or immediately after pulled apart in the opening movement of the valve body.

4 Claims, 8 Drawing Sheets

(56) References Cited

U.S. PATENT DOCUMENTS

2014/0110619 A1* 4/2014 Borichevsky et al. ..................... F16K 51/02
  251/326
2018/0243961 A1* 8/2018 Bazzo ................ B29C 45/2806

* cited by examiner

[Fig. 1]
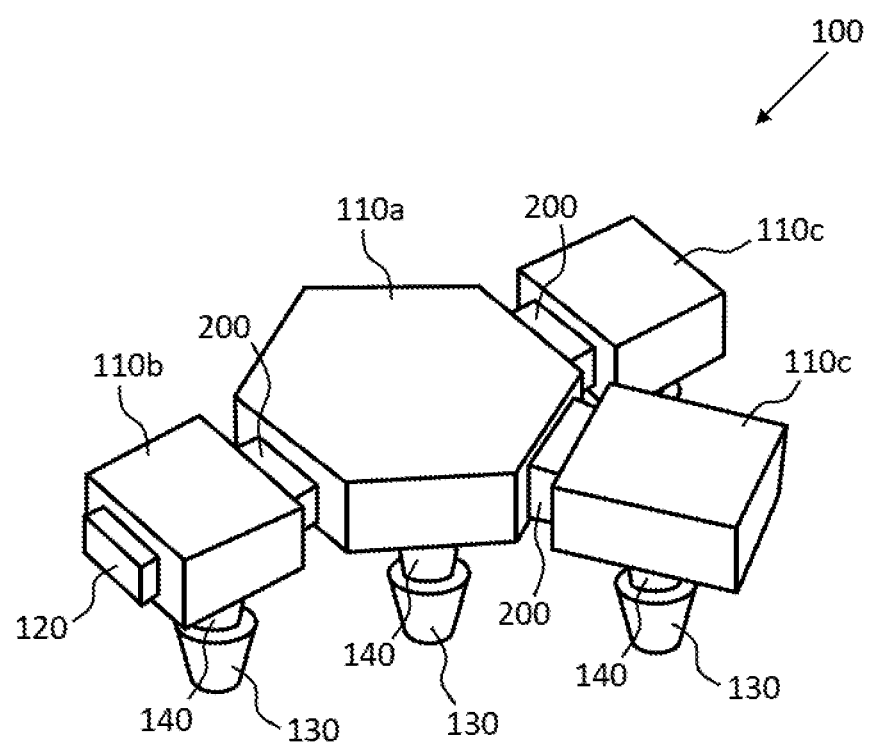

[Fig. 2]
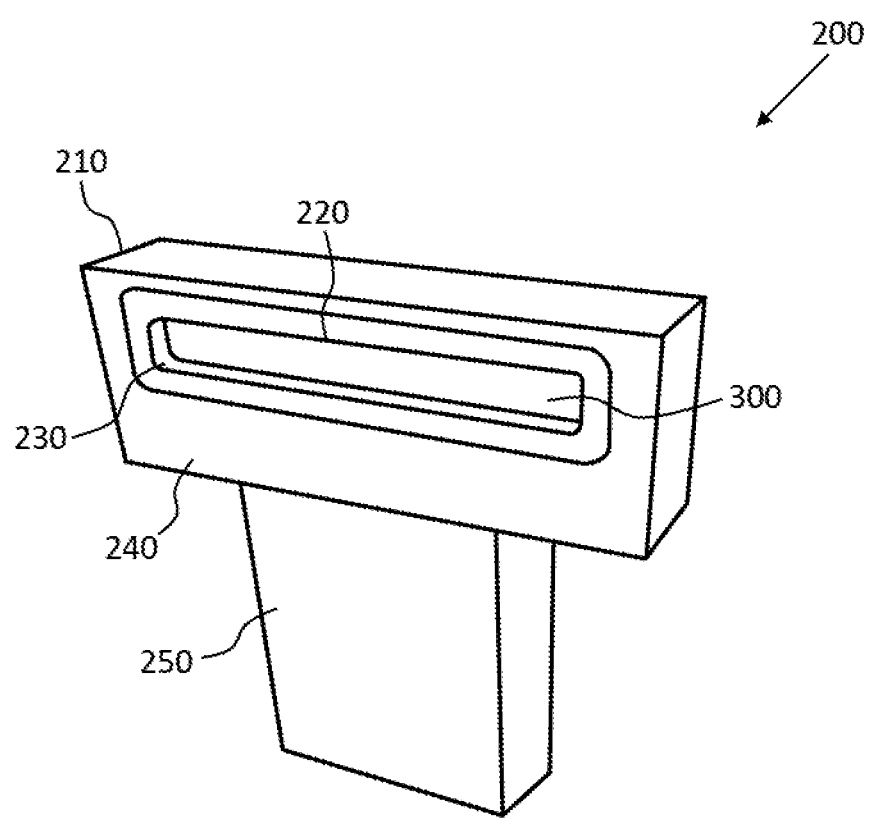

[Fig. 3]
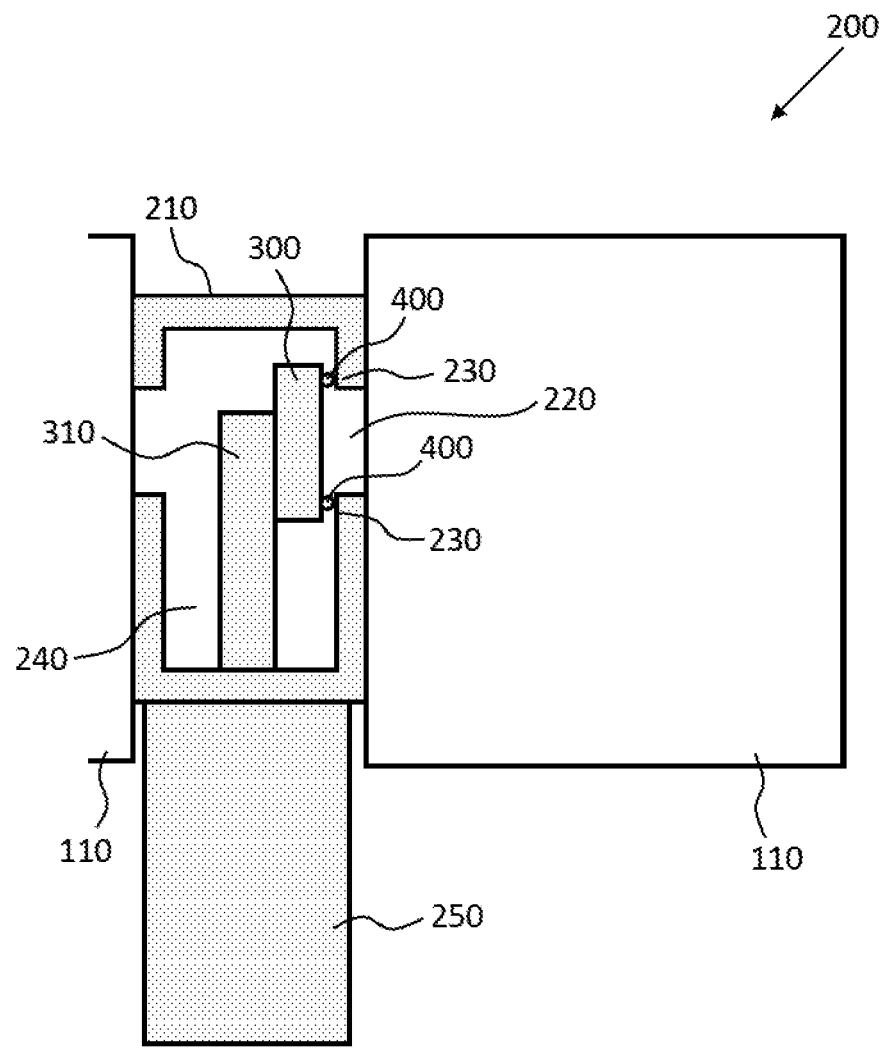

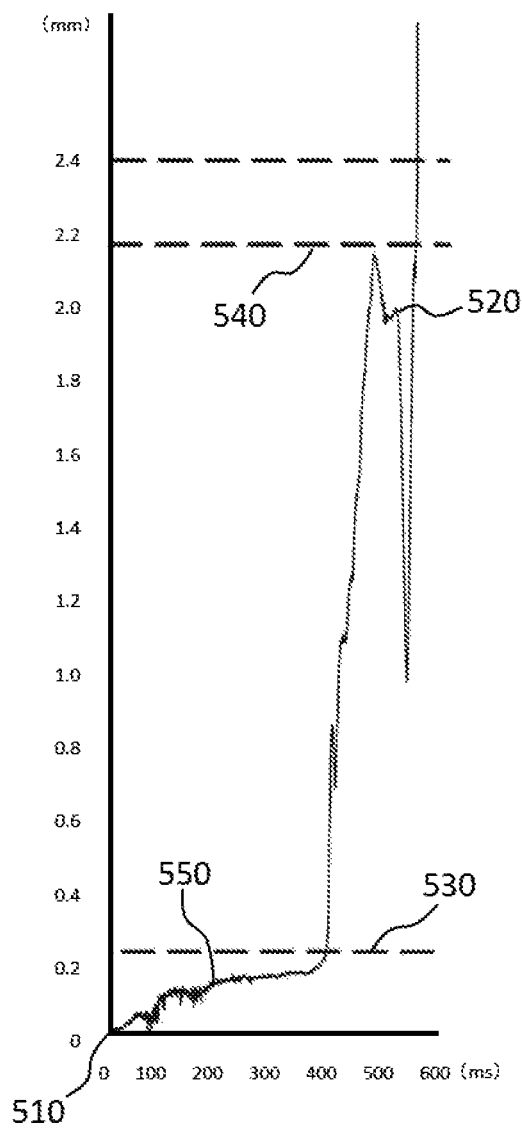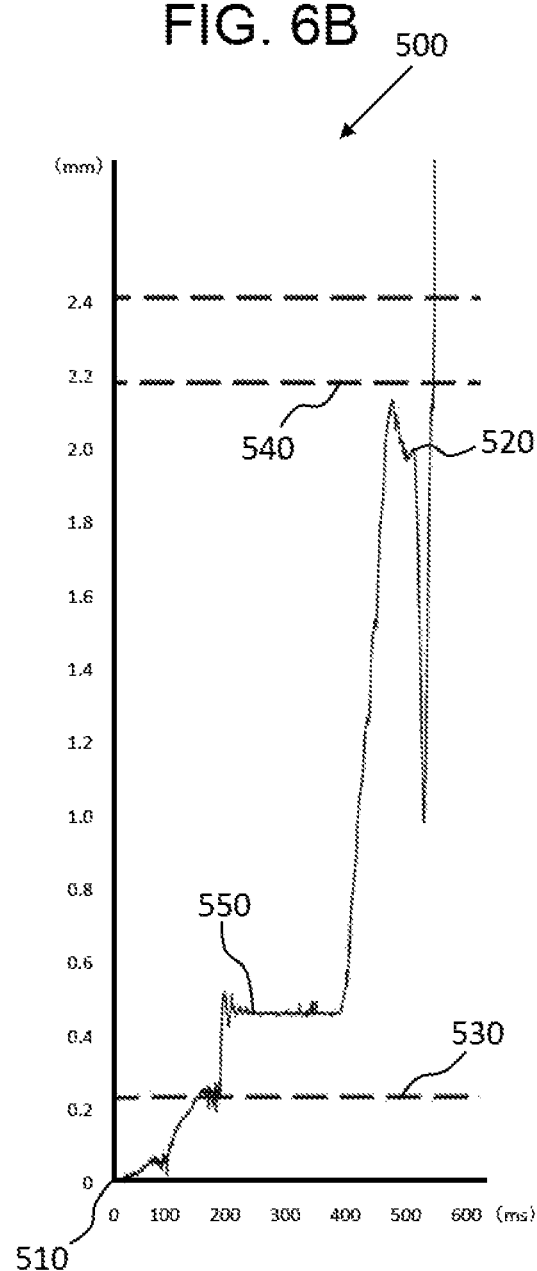

FIG. 7A
FIG. 7B
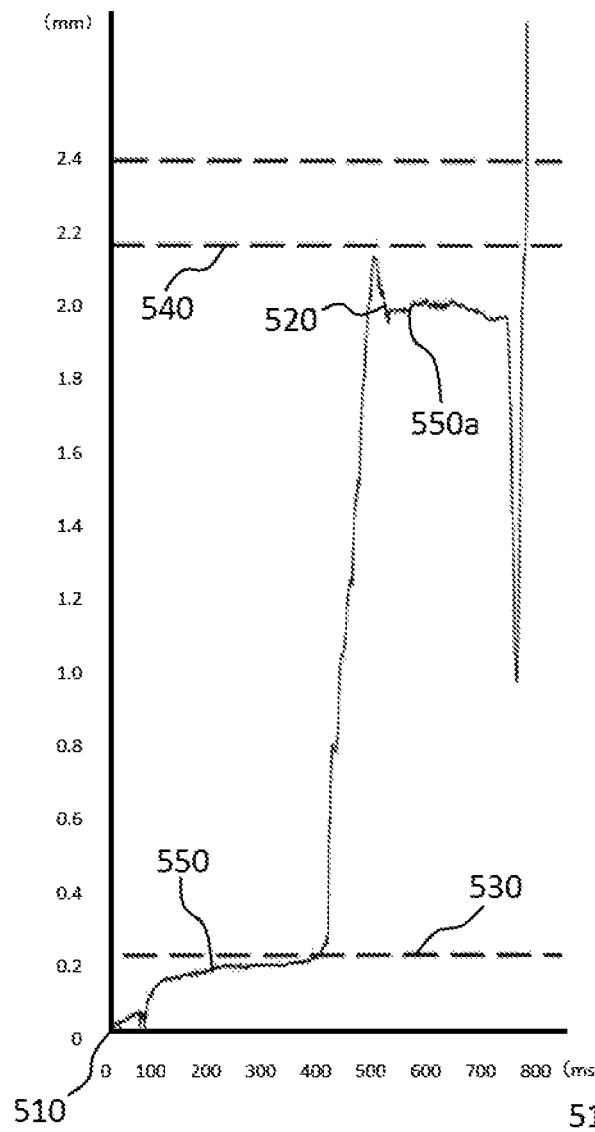
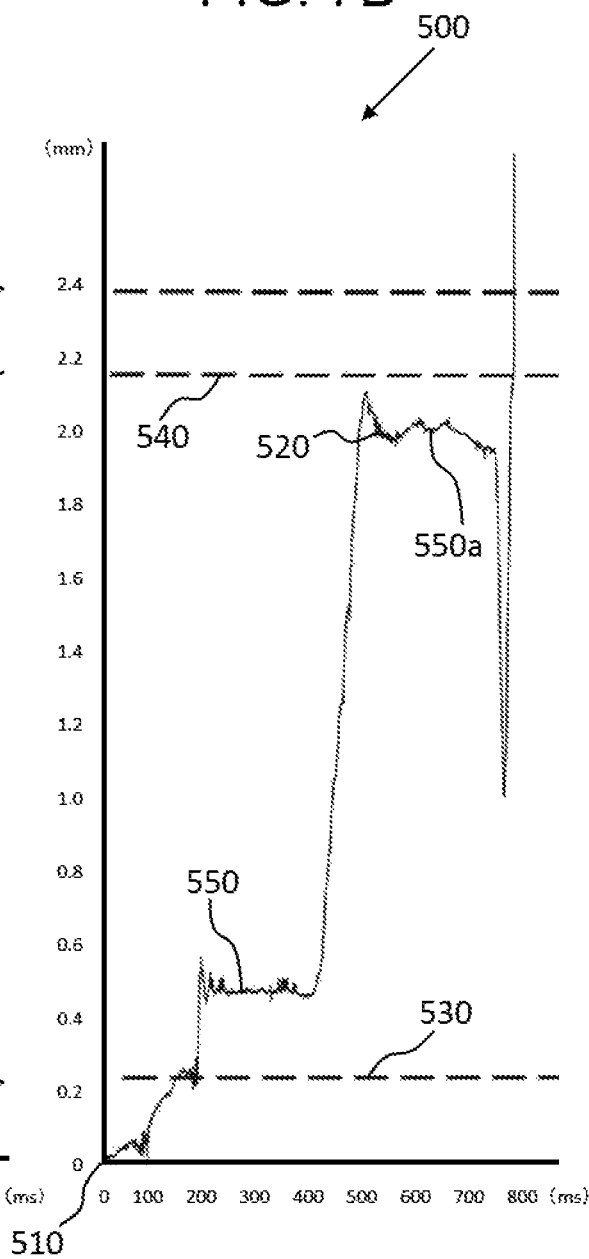

[Fig. 8]
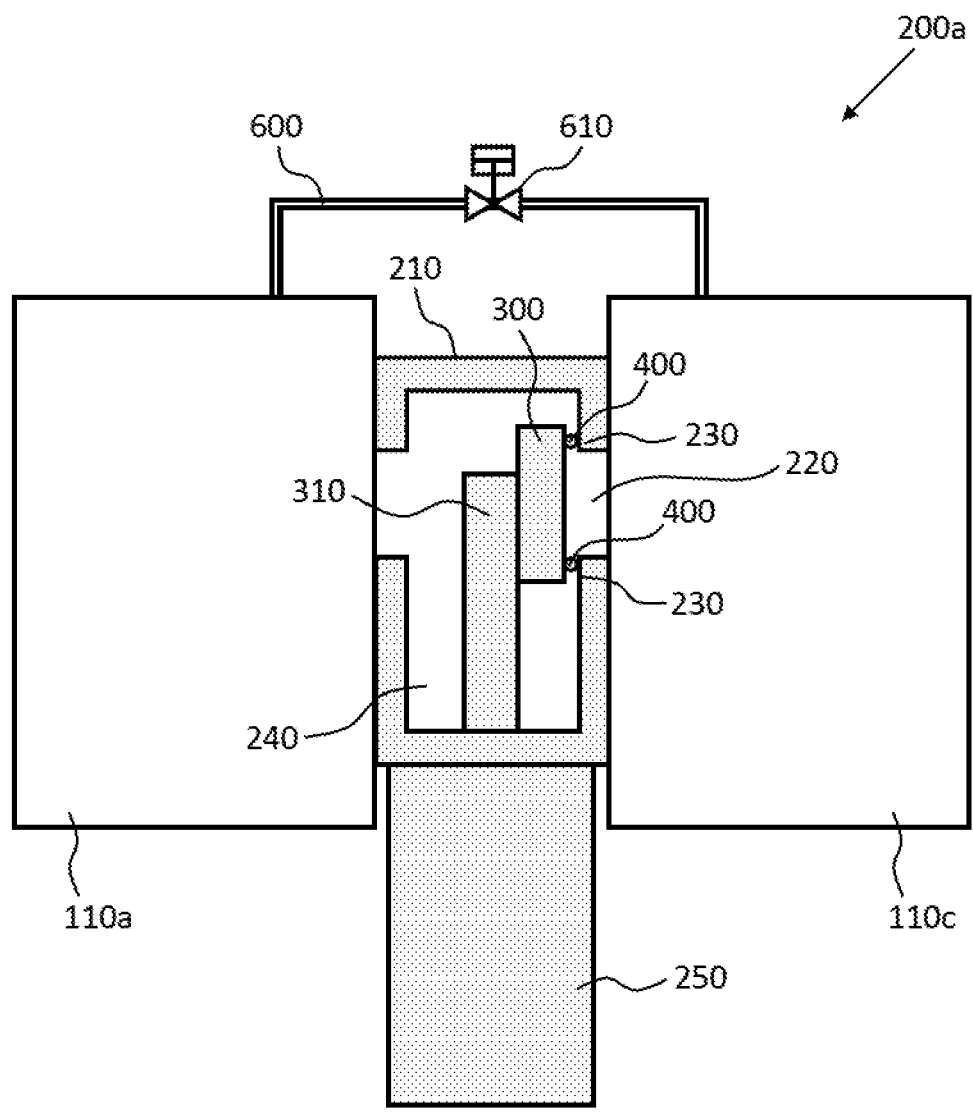

METHOD OF CONTROLLING A GATE VALVE

TECHNICAL FIELD

The present invention relates to a method for suppressing vibration when opening a gate valve provided on an opening of a vacuum chamber.

BACKGROUND ART

Various processes in manufacturing such as semiconductor elements, solar cells, and liquid crystals include a means for forming thin film on wafers (semiconductor substrates such as silicon) or on glass substrates by such as vacuum evaporation, spattering, and CVD (chemical vapor deposition) or include means for etching to scrape off unnecessary portions from the substrate.

In a sputtering apparatus for example, an inert gas such as argon (Ar) is introduced into a vacuum chamber in which a substrate is placed, and a high frequency voltage is applied under a predetermined degree of vacuum to generate plasma, which bombards a target material so that the material ejected from the target adheres on the substrate forming a thin film.

In a dry etching apparatus, a necessary portion of a thin film is masked with a resist placed over a substrate on which a thin film is formed, plasma is generated in a vacuum chamber, unnecessary portions are scraped off, and then the unnecessary resist is removed.

In a semiconductor manufacturing apparatus, a plurality of chambers is provided, and a substrate is conveyed to the chamber in which processing is performed for each process. Between chambers is separated with a gate valve, and the gate valve opens or closes when the substrate is conveyed. Incidentally, as described in Patent Literature 1, there is also a disclosure of invention of a method of controlling vacuum valves arranged between two vacuum spaces.

If vibration or similar movement occurs when conveying the substrate due to open or close of the gate valve, particles may be generated in the chamber, which may contaminate the substrate. Incidentally, as described in Patent Literature 2, there disclosed an invention of a gate valve which suppresses vibration which propagate to the processing chamber and does not generate particles in the processing chamber.

LITERATURES OF RELATED ART

Patent Literatures

[Patent Literature 1]
Japanese Unexamined Patent Application Publication No. 2006-52846
[Patent Literature 2]
Japanese Patent No. 3433207

SUMMARY OF INVENTION

Technical Problem

The invention described in Patent Literature 1 aims to achieve good sealing in a closed state while reducing deterioration of a flexible seal of a vacuum valve. There is however a possibility that particles may be generated when the vacuum valve is opened.

Further, in the invention described in Patent Literature 2, the valve body is sealed or un-sealed in a way tilting a valve rod supporting the valve body that seals the gate valve. Therefore, if it is attempted to un-seal the compressed sealing member in a short time, the valve body possibly vibrates.

It is therefore an object of the present invention to provide a method of controlling a gate valve that performs opening operation in a short time while suppressing vibration of the valve body.

Solution to Problem

In order to solve the above-stated problem, the present invention provides a method of controlling a gate valve installed at the opening of a chamber. The gate valve is comprised of a valve body that opens and closes so as to close the opening, a valve seat provided at the edge of the opening and against which the valve body is pressed, and a sealing material provided for sealing between the valve body and the valve seat. The method is characterized in that, in moving the valve body to the open position from the closed position where the valve bode is pressed against the valve seat with the sealing material compressed, the valve body is stopped temporarily during opening motion at the position immediately before or immediately after the sealing material being apart off, to suppress the vibration of the valve body while the valve body is in opening motion.

In addition, the invented method of controlling the gate valve is characterized in that the valve body is further made to stop temporarily at the position after the above-mentioned temporary stop but before the opening position.

Further, in the method of controlling the gate valve, the gate valve is provided between one chamber and another chamber having a different barometric pressure, and the gate valve is opened after the pressure difference between that one chamber and that another chamber is adjusted.

Further, the invented gate valve is characterized in that the gate valve is opened by the above-mentioned method.

Advantageous Effects of Invention

According to the present invention, even if the valve body of the gate valve is opened in a shorter time, vibration of the valve body itself and the entire gate valve due to being apart off of the sealing material is suppressed to a minimum, and the contamination of the substrate due to the generation of particles can be prevented.

BRIEF DESCRIPTION OF DRAWINGS

FIG. 1 is a perspective view of an overview of a semiconductor manufacturing apparatus in which a gate valve of the present invention is installed.

FIG. 2 is a perspective view of outline the gate valve of the present invention.

FIG. 3 is a cross sectional view of the construction of the gate valve of the present invention.

FIGS. 6A and 6B are graphs to show a result of a case where the temporary stop of the valve body is applied in the method of controlling the gate valve of the present invention.

FIGS. 7A and 7B are graphs to show a result of a case where the temporary stop of the valve body is applied two times in the method of controlling the gate valve of the present invention.

FIG. 8 is a cross sectional view for describing the control workings in a case where the gate valve of the present invention is arranged between two chambers.

MODE OF IMPLEMENTING INVENTION

Figure 4A:
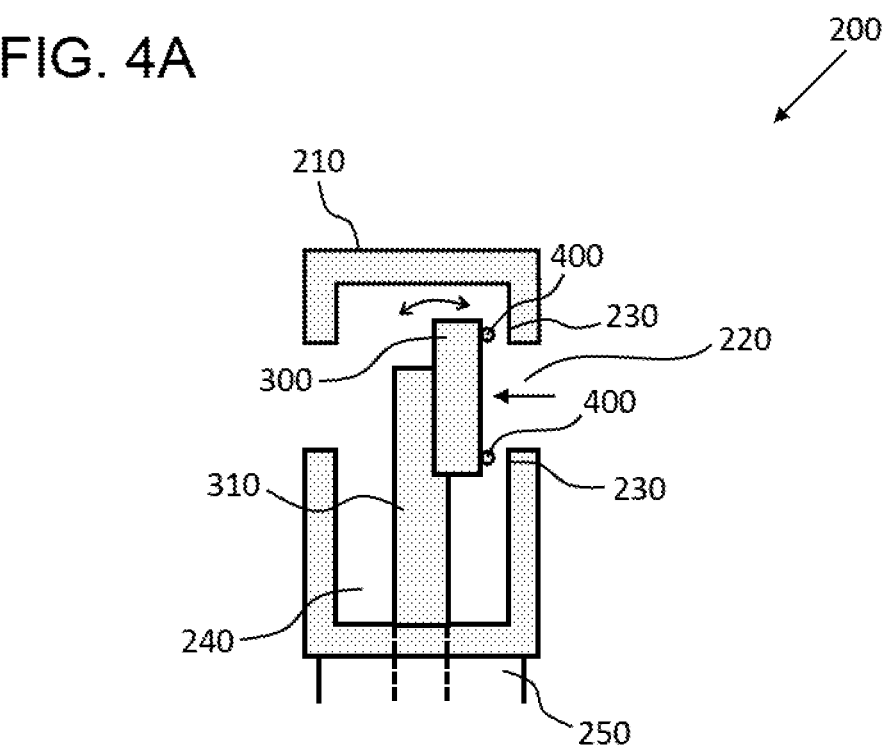
FIGS. 4A and 4B are cross sectional views for describing the working of the gate valve of the present invention.

Hereinafter, embodiments of the present invention will be described in detail referring to the drawings. Those having the same function are denoted by the same reference numerals, and repeated explanations thereof may be omitted.

Embodiment 1

First, the described will be a semiconductor manufacturing apparatus in which the gate valve of the present invention is installed. FIG. 1 is a perspective view showing an overview of a semiconductor manufacturing apparatus in which a gate valve is installed between a plurality of chambers.

As shown in FIG. 1, a semiconductor manufacturing apparatus 100 includes a plurality of chambers 110, and a substrate is conveyed to each chamber 110 for processing. For example, the layout of the manufacturing apparatus includes such as an in-line type in which a plurality of chambers 110 are arranged on a straight line and a cluster type in which a plurality of chambers 110 are arranged in a star configuration around a transfer chamber. Among these layouts, the cluster layout is the main stream because the cluster type does not occupy much space even when the number of chambers 110 increases.

In the cluster type semiconductor manufacturing apparatus 100, a load lock chamber 110b serving as a preliminary vacuum chamber, a process chamber 110c serving as a processing chamber, and the like are arranged around a transfer chamber 110a that serves as a chamber for transferring.

A gate valve 200 is provided between the transfer chamber 110a and the load lock chamber 110b and between the transfer chamber 110a and the process chamber 110c. In addition, a door valve 120 is provided at the entrance of the load lock chamber 110b. Further, a vacuum pump 130 is installed, via an exhaust valve 140, to each of the transfer chamber 110a, the load lock chamber 110b, and the process chamber 110c.

In advance, the transfer chamber 110a and the process chamber 110c are depressurized to a predetermined pressure by opening the exhaust valve 140 and by the vacuum pump 130. Opening the door valve 120 allows the substrate conveyed into the load lock chamber 110b from the outside. The load lock chamber 110b is depressurized to the same pressure as that of the transfer chamber 110a with the vacuum pump 130 by opening the exhaust valve 140.

Opening the gate valve 200, the substrate is conveyed from the load lock chamber 110b to the transfer chamber 110a and further conveyed therefrom to each process chamber 110c in accordance with the required process. When the substrate is processed in one process chamber 110c, the processed substrate is conveyed back to the transfer chamber 110a and conveyed to another process chamber 110c.

The gate valve 200 opens when the substrate is to be conveyed out from one chamber 110 to transfer into the adjacent another chamber 110, and then the gate valve closes when the conveying the substrate completes. The gate valve 200 hermetically seals to prevent such as gas and particles from moving from that one chamber 110 to the other chamber 110.

Figure 4B:
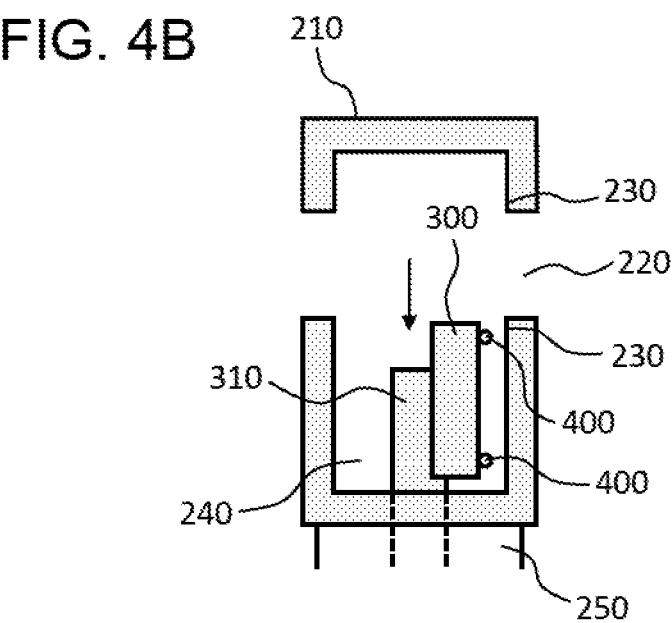

Next, described is a gate valve to which the control method according to the present invention is applied. FIG. 2 is a perspective view showing an overview of a gate valve. FIG. 3 is a cross-sectional view showing the structure of the gate valve. FIG. 4 is a cross-sectional diagram for describing the operation of the gate valve. Note that the front side is called as the front and the rear side is called as the rear. In FIGS. 3 and 4 therefore, the right side of the illustration is the front.

As shown in FIG. 2, the gate valve 200 has a valve body 300 that closes an opening 220 connected to the chamber 110, a valve seat 230, against which the valve body 300 is pressed, provided at the edge of the opening 220, and a sealing material 400 which seals between the valve body 300 and the valve seat 230. As the gate valve 200, there is a rectangular type valve in which the valve body 300 moves up and down with respect to the rectangular opening 220.

The valve body 300 is accommodated in a frame 210 of the gate valve. On the front (and the rear) of the upper part of the frame 210, the opening 220 opens, and an accommodation 240 is provided on the bottom of the frame 210 to accommodate that valve body when the valve body opens. On the underside of the valve body 210, a driving unit 250 for opening or closing the valve body is provided.

As the shape of the opening 220, a rectangular shape for example is enough as far as the opening has a height and width whose dimensions allow a substrate to pass therethrough. The driving unit 250 is, for example, required to have only a raising and lowering mechanism, such as an actuator, that vertically moves the valval body 300. The accommodation 240 is only required to ensure a space inside the frame 210 so that the opening 220 will be released when the valve body 300 is lowered.

As shown in FIG. 3, the opening 220 opened on the front and rear of the hollow frame 210 is abutted to the entrance or exit of the chamber 110. The valve body 300 is supported by a valve rod 310 which extends from the driving unit 250 to the inside the frame 210, and is arranged at the position where the opening 220 is closed. The size of a valve body 330 is made large more than the opening 220 to ensure the valve seat 230 provided on the edge of the opening 220 partly overlaps with the edge of the valve body 330.

On the edge of the valve body 330, a sealing material 400 of annular shape is installed surrounding the opening 220. In closing the opening 220, the valve body 330 is pressed against the valve seat 230 so that the sealing material 400 is compressed. Where, for example, the valve body 300 and the valve seat 230 are made of metal, use of resin such as rubber for the sealing material 400 will ensure air tightness of the chamber 110.

As shown in FIG. 4, the opening movement of the gate valve 200 includes: (a) backward movement of the valve body 300 for pulling the sealing material 400 apart from the valve seat 230 and (b) bringing down movement of the valve body 300 for releasing the opening 220.

If the sealing material 400 is rapidly pulled apart at one time by the backward movement of the valve body 300 the valve body 300 vibrates around the lower end of the valve rod 310 as a fulcrum, because the sealing material 400 is sucked to the valve body 230, and that vibration propagates causing vibration of the gate valve 200. In addition, the pulling apart of the sealing material 400, and the vibrations of the valve body 300 and the gate valve 200 generate a large sound.

Note that, the closed position is a position of the valve body 300 in the state where the sealing material 400 is pressed against the valve seat 230 and the open position is a position of the valve body 300 in the state where the sealing material 400 is pulled apart from the valve seat 230 and retracted position. In addition, the compression amount is the difference between the thickness of the sealing material at the open position and the thickness of the sealing material 400 at the closed position.

When the valve body 300 is lowered in a vibrating state, a load is imposed on the driving unit 250 that is for raising and lowering the valve rod 310, making it difficult for the valve body 300 to be accommodated in the accommodation 240, and in addition, causing the vibration to propagate to the gate valve 200.

When the valve body 300 or the gate valve 200 vibrates, the particles in the frame body 210 may fly up to enter the chamber 110. Particularly, if the barometric pressure in the chamber 110 is low, particles are likely to enter the chamber 110, and a substrate placed in the chamber 110 may be contaminated degrading its product quality.

To suppress the vibration of the valve body 300, the valve body 300 is stopped temporarily for a very short time while the valve body 300 retreats from the closed position to the open position after the sealing material 400 is pulled apart from the valve seat 230. The temporary stop of the valve body 300 may be made plural times, two times for example, in one retreating movement.

Next, the following describes the controlling method of the gate valve of the present invention. FIG. 5 is a graph that shows the result of a case where the temporary stop of the gate valve is not executed. FIG. 6 is a graph that shows the result of a case where the temporary stop of the gate valve is executed. FIG. 7 is a graph that shows the result of a case where the temporary stop of the gate valve is executed two times.

FIGS. 5 to 7 are a time series description of the position of the valve body 300 when the gate valve 200 is made open. The distance to the surface of the valve body 300 and the distance to the surface of the frame 210 are measured by such as irradiating a laser beam from the front face of the gate valve 200 and the distance difference between them is defined as a relative position 500 of the valve body 300.

A closed position 510 of the valve body 300 is a position where the sealing material 400 is pressed against the valve seat 230 with 0.2 mm of a compression amount 530 and the open position 520 of the valve body 300 is 2.0 mm away from the closed position. Shown is an aspect where the valve body 300 is moved from the closed position 510 to an open position 520 and then the valve body 300 is lowered to be accommodated in the accommodation 240.

Figure 5A:
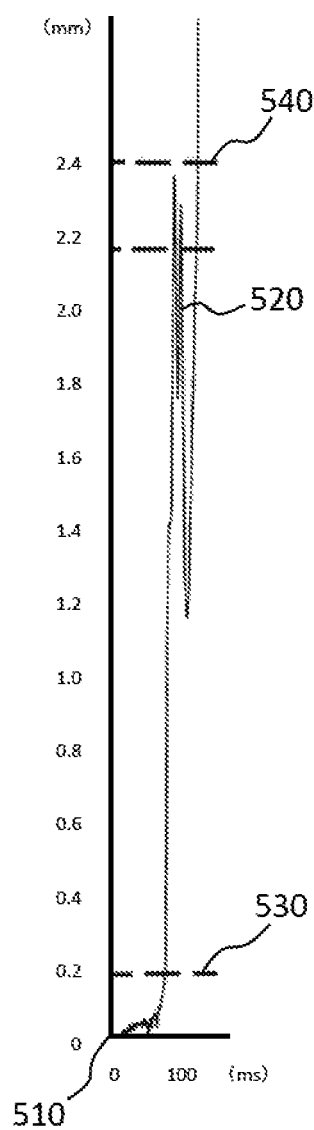
FIGS. 5A and 5B are graphs to show a result of a case where the temporary stop of the valve body is not applied in the method of controlling the gate valve of the present invention.

As shown in FIG. 5(a), when the valve body 300 is moved from the closed position 510 to the open position 520, the valve body 300 is sucked to the valve seat 230 in the range of the compression amount 530 of the sealing material 400, and is pulled toward the opposite side to the moving direction of the valve body 300. The valve body 300 is earlier comes apart from the sealing material 400 before the compression amount 530 reduces to zero, or is later comes apart from the sealing material 400 exceeding the compression amount 530. In either case, the valve body is biased by the sealing material 400.

When the valve body 300 comes apart from the valve seat 230, the valve body 300 vigorously moves away from the valve seat 230 with bending, then the valve body 300 comes to a state of vibration 540 due to the bending when reaching the open position. In this vibration, the amplitude of the vibration 540 is about 0.4 mm. Thereafter, as the valve body 300 lowers, a part of the sealing material 400 comes to be measured for distance difference, and when the valve body 300 is accommodated, the inner back wall of the frame 210 is to be measured.

Figure 5B:
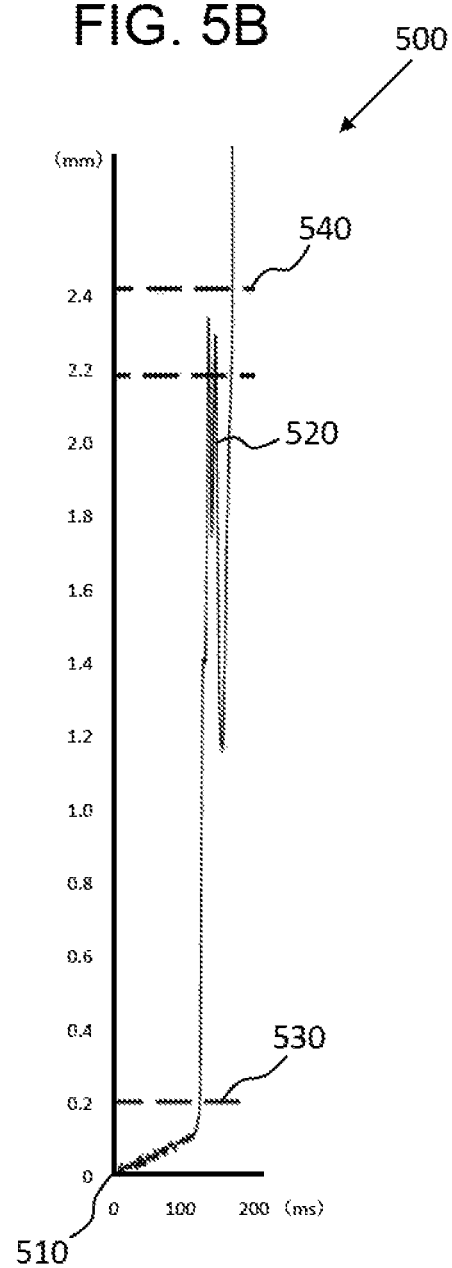

As shown in FIG. 5(b), when the moving rate of the valve body 300 from the closed position 510 to the open position 520 is made slow, the amplitude of the vibration 540 comes larger than 0.2 mm, because the influence of the bending biased by the sealing material 400 is large, even if the moving speed of the valve body 300 itself is somewhat changed.

As shown in FIG. 6(a), the valve body 300 is moved from the closed position 510 toward the open position, and before the valve body 300 reaches a position where the compression amount 530 of the sealing material 400 comes to zero, the valve body 300 is made to do a temporal stop 550 for a predetermined time (for example, about 200 to 300 milliseconds), and the amplitude of the vibration 540 of the valve body 300 when the movement of the valve body 300 is resumed is smaller than 0.2 mm.

Further, as shown in FIG. 6(b), after the pulling apart the valve body 300 moving from the closed position 510 toward the open position beyond the compression amount 530 of the sealing material 400, the valve body 300 is made to do the temporal stop 550 for a predetermined time (for example, about 200 to 300 milliseconds), and then the amplitude of the vibration 540 of the valve body 300 when the movement of the valve body 300 is resumed is also smaller than 0.2 mm.

That is, by the temporal stop 550 of the valve body 300 at a position immediately before or immediately after the sealing material 400 pulled apart near the position where the compression amount 530 of the sealing material 400 decreases to zero, the vibration 540 of the valve body 300 is largely suppressed.

As shown in FIG. 7(a), when the valve body 300 makes the temporal stop 550 immediately before the sealing material 400 is pulled apart, and thereafter the valve body 300 is further made to make a temporal stop 550a at the position immediately before reaching the open position 520, the vibration 540 caused by the valve body 300 reaching the open position 520 is also suppressed.

As shown in FIG. 7(b), when the valve body 300 is made to make the temporal stop 550 immediately after the sealing material 400 is pulled apart, and the valve body 300 is further made to make the temporal stop 550 immediately before reaching the open position 520, the vibration 540 caused by the valve body 300 reaching the open position 520 is also suppressed.

That is, the temporal stop 550 of the valve body 300 at the position immediately before or immediately after the sealing material 400 is pulled apart suppresses the vibration 540 from developing large due to the bending of the valve body 300 associated with the suction of the sealing material 400. The temporal stop 550a of the valve body 300 immediately before the opening position 520 restrains the generation itself of the vibration 540 due to the stop of the valve body 300.

Embodiment 2

FIG. 8 is a cross-sectional view to describe the control working where the gate valve of the present invention is disposed between two chambers. When a pressure difference exists between one chamber and adjacent another chamber, gas flows into the chamber of lower barometric pressure, and particles are more likely to enter.

As shown in FIG. 8, in the case where the chamber 110*a* and the chamber 110*c* are communicated each other via the gate valve 200*a*, a gas passage 600, for example, is connected between the chamber 110*a* and the chamber 110*c*, and in the middle of a gas passage 600 a valve 610 is provided.

In transferring the substrate from the chamber 110*a* to the chamber 110*c*, if the barometric pressures of the chamber 110*a* and the chamber 110*c* are different, the valve body 300 can be opened by making the barometric pressure difference between chamber 110*a* and chamber 110*c* eliminated by opening the valve 610 to flow gas through the gas passage 600.

As described above, even if the valve body 300 of the gate valve 200 is opened for a short time in the semiconductor manufacturing apparatus 100, the vibration of the valve body 300 itself and the entirety of the gate valve 200 due to the pulling apart of the sealing material 400 can be minimized, and thereby it is possible to prevent particles from generating to contaminate the substrate.

Although the embodiments of the present invention have been described above, the present invention is not limited thereto.

REFERENCE SIGNS LIST

100: Semiconductor manufacturing apparatus
110: Chamber
110*a*: Transfer chamber
110*b*: Load lock chamber
110*c*: Process chamber
120: Door valve
130: Vacuum pimp
140: Exhaust valve
200: Gate valve
210: Frame
220: Opening
230: Valve seat
240: Accommodation
250: Driving unit
300: Valve body
310: Valve rod
400: Sealing material
500: Relative position
510: Closed position
520: Open position
530: Compression amount
540: Vibration
550: Temporal stop
550*a*: Temporal stop
600: Gas passage
610: Valve

The invention claimed is:

1. A method of controlling a device provided on an opening of a chamber, the method comprising:
   providing a gate valve, the gate valve having a valve body that opens and closes so as to close the opening of the chamber, a valve seat provided on an edge of the opening so that the valve body is pressed against the valve seat, and a sealing material that seals between the valve body and the valve seat; and
   opening the valve body from the closed position where the valve body is pressed against the valve seat so that the sealing material is compressed, the valve body is made to temporarily stop at a first position immediately before or immediately after the sealing material is separated, so that the vibration of the valve body itself is suppressed at the position immediately before or immediately after the compressed sealing material is pulled apart or immediately before the pulling apart in the opening movement of the valve body.

2. The method according to claim 1,
   wherein the valve body is further made to stop temporarily after the temporary stop as in claim 1 and before a stopping at a second position that is after the first position.

3. The method according to claim 1,
   wherein the gate valve is provided between one chamber and another chamber of which barometric pressure is different from that one chamber and the valve body is opened after the barometric pressure difference between that one chamber and that another chamber is adjusted.

4. A gate valve which opens by controlling method according to claim 1.

* * * * *